United States Patent [19]

Kuck et al.

[11] Patent Number: 4,618,345
[45] Date of Patent: Oct. 21, 1986

[54] METHOD OF PREPARING HIGH PURITY WHITE PHOSPHORUS

[75] Inventors: Mark A. Kuck, Upper Montclair, N.J.; Susan W. Gersten, Elmsford, N.Y.

[73] Assignee: Stauffer Chemical Company, Westport, Conn.

[21] Appl. No.: 581,105

[22] Filed: Feb. 17, 1984

[51] Int. Cl.$^4$ ............................................. B01D 3/10
[52] U.S. Cl. ............................... 23/293 R; 23/294 R; 423/322
[58] Field of Search ..................... 423/322; 23/293 R

[56] References Cited

U.S. PATENT DOCUMENTS 4,483,746  11/1984  Rosenhouse et al. ................ 423/322

FOREIGN PATENT DOCUMENTS

| 688221 | 6/1964 | Canada ................................. 423/322 |
| 1188053 | 6/1961 | Fed. Rep. of Germany ...... 423/322 |
| 143705 | 9/1980 | Fed. Rep. of Germany ...... 423/322 |
| 14685 | 6/1969 | Japan ................................... 423/322 |
| 5437 | 2/1973 | Japan ................................... 423/322 |
| 981420 | 1/1965 | United Kingdom ................. 423/322 |

Primary Examiner—John Doll
Assistant Examiner—Wayne A. Langel
Attorney, Agent, or Firm—F. Eugene Davis, IV

[57] ABSTRACT

Liquid white phosphorus is distilled from red phosphorus in vacuo at 480°–490° C. The vapor is transferred in a conduit maintained at 250° C. and condensed into liquid white phosphorus at room temperature. The liquid white phosphorus is then filtered to eliminate any condensed red phosphorus. The clear, colorless phosphorus produced may be utilized as a source of $P_4$ species for chemical vapor deposition, sputtering, vacuum deposition, and molecular beam deposition of phosphorus, polyphosphide, and other phosphorus compound films for semiconductor and other applications including insulation and passivation.

12 Claims, 1 Drawing Figure

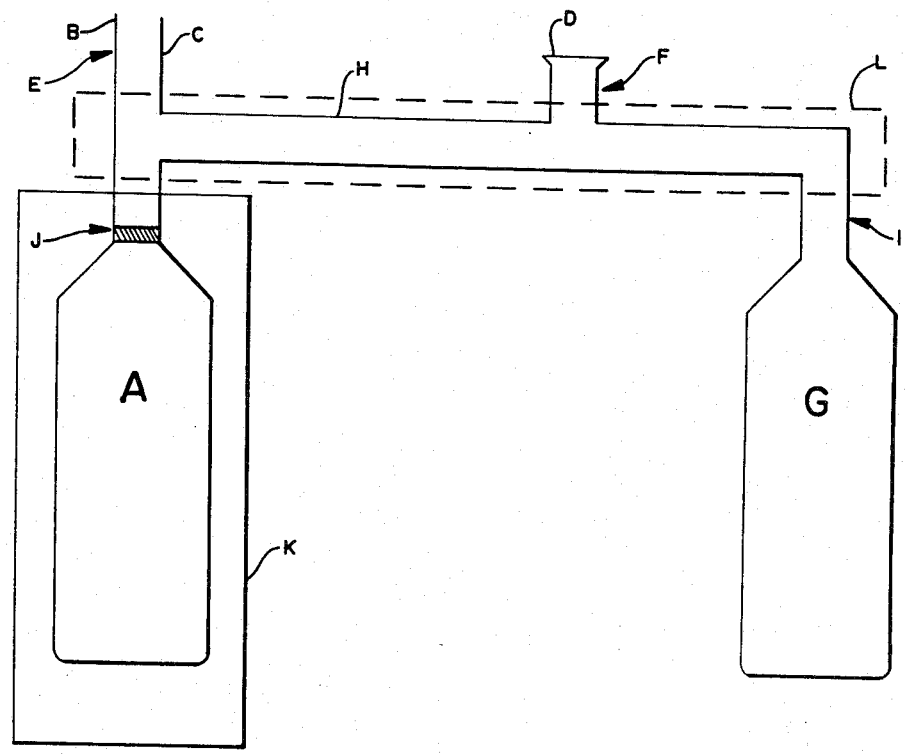

METHOD OF PREPARING HIGH PURITY WHITE PHOSPHORUS

RELATED APPLICATIONS

This application is related to the following co-pending applications, assigned to the same assignee as this application. These applications are incorporated herein by reference. U.S. patent application entitled CATENATED SEMICONDUCTOR MATERIALS OF PHOSPHORUS, METHODS AND APPARATUS FOR PREPARING AND DEVICES USING THEM, Ser. No. 335,706, filed Dec. 30, 1981, now abandoned; MONOCLINIC PHOSPHORUS FORMED FROM VAPOR IN THE PRESENCE OF AN ALKALI METAL, Ser. No. 419,537, filed Sept. 17, 1982; CATENATED PHOSPHORUS MATERIALS, THEIR PREPARATION AND USE, AND SEMICONDUCTOR AND OTHER DEVICES EMPLOYING THEM, Ser. No. 442,208, filed Nov. 16, 1982, which is a Continuation-in-Part of Ser. Nos. 335,706 and 419,537; VACUUM EVAPORATED FILMS OF CATENATED PHOSPHORUS MATERIAL, Ser. No. 509,159, filed June 29, 1983; GRAPHITE INTERCALATED ALKALI METAL VAPOR SOURCES, Ser. No. 509,157, filed June 29, 1983; SPUTTERED SEMICONDUCTING FILMS OF CATENATED PHOSPHORUS MATERIAL AND DEVICES FORMED THEREFROM, Ser. No. 509,175, filed June 29, 1983; MIS DEVICES EMPLOYING ELEMENTAL PNICTIDE OR POLYPHOSPHIDE INSULATING LAYERS, Ser. No. 509,210, June 29, 1983; and, LIQUID PHASE GROWTH OF CRYSTALLINE POLYPHOSPHIDE, Ser. No. 509,158, filed June 29, 1983; also, the applications filed herewith of David G. Brock and John A. Baumann for THERMAL CRACKERS FOR FORMING PNICTIDE FILMS IN HIGH VACUUM PROCESSES; Diego J. Olego, John A. Baumann, Paul M. Raccah, Rozalie Schachter, Harvey B. Serreze and William E. Spicer for PASSIVATION AND INSULATION OF III-V DEVICES WITH PNICTIDES, PARTICULARLY AMORPHOUS PNICTIDES HAVING A LAYER-LIKE STRUCTURE; Diego J. Olego for PNICTIDE BARRIERS IN QUANTUM WELL DEVICES; Diego J. Olego for USE OF PNICTIDE FILMS FOR WAVEGUIDING IN OPTO-ELECTRONIC DEVICES; Rozalie Schachter and Marcello Viscogliosi for VACUUM DEPOSITION PROCESSES EMPLOYING A CONTINUOUS PNICTIDE DELIVERY SYSTEM, PARTICULARLY SPUTTERING; Mark A. Kuck and Susan W. Gersten for CONTINUOUS PNICTIDE SOURCE AND DELIVERY SYSTEM FOR FILM DEPOSITION, PARTICULARLY BY CHEMICAL VAPOR DEPOSITION; Robert Parry, John A. Baumann and Rozalie Schachter for PNICTIDE TRAP FOR VACUUM SYSTEMS; and, Mark A. Kuck, Susan W. Gersten, John A. Baumann and Paul M. Raccah for HIGH VACUUM DEPOSITION PROCESSES EMPLOYING A CONTINUOUS PNICTIDE DELIVERY SYSTEM.

TECHNICAL FIELD

This invention relates to a method of preparing high purity white phosphorus; to sources of $P_4$ vapor species; to the deposition of films of phosphorus, polyphosphides, and other phosphorus compounds; to chemical vapor deposition, sputtering, vacuum deposition, and molecular beam deposition; to semiconductor devices, and the insulation and passivation thereof.

BACKGROUND ART

Extremely high purity phosphorus is required in growing films of phosphorus, polyphosphides and other phosphorus compounds by chemical vapor deposition, sputtering, vacuum deposition and molecular beam deposition for use in semiconductor devices. The $P_4$ vapor species utilized in these processes has to be extremely pure. Liquid white phosphorus is a convenient source of this species. It is therefore highly desirable to have a source of high purity white phosphorus. However, high purity white phosphorus is not available commercially.

OBJECTS OF THE INVENTION

It is therefore an object of the invention to provide high purity white phosphorus.

Another object of the invention is to provide high purity white phosphorus in a form which may be easily utilized as a $P_4$ vapor source for chemical vapor deposition, sputtering, vacuum deposition, molecular beam deposition, and the like.

Other objects of the invention will in part be obvious and will in part appear elsewhere in this application.

The invention accordingly comprises the several steps and the relation of one or more of such steps with respect to each of the others which are exemplified in the following detailed disclosure. The scope of the invention is indicated in the claims.

BRIEF DESCRIPTION OF THE DRAWINGS

For a fuller understanding of the nature and objects of the invention, reference should be made to the following detailed description taken in connection with the accompanying drawing in which the sole FIGURE is a schematic diagram of apparatus for producing high purity white phosphorus according to the invention.

DISCLOSURE OF THE INVENTION

BEST MODE FOR CARRYING OUT THE INVENTION

Using a Pyrex glass apparatus of the design shown in FIG. 1, 25 grams of high purity (99.9999% P) red phosphorus is loaded into bulb A through loading tube B. This transfer is made in a nitrogen-purged glove box. A quartz wool plug J is installed over the red phosphorus. The tube B is stoppered at C and the apparatus is attached to a vacuum line at "O" ring joint D and evacuated to $10^{-4}$ to $10^{-5}$ Torr. Using an oxygen torch, the loading arm B is collapsed and pulled off at E. Then the apparatus is isolated from the vacuum line by collapsing the tube at F. Bulb A is then heated to and maintained at a temperature within the range of 450° to 550° C., preferably within 480° to 490° C., in furnace K. The quartz wool plug J insures that none of the solid red phosphorus charge passes into transfer tube H. The collection bulb G is maintained below 100° C., preferably at ambient temperature (approximately 20° C.). The transfer tube H is maintained at between 100° and 400° C., preferably 250° C., by a wrap of heating tape L. Complete conversion of the red phosphorus charge to white phosphorus is realized in approximately 3 hours. With an oxygen torch, the product is isolated by collapsing the tube at I.

A final purification step, to eliminate particles of red phosphorus that sometimes condense in bulb G, involves filtration of the liquid white phosphorus through a Whatman #50 paper filter mounted in a Swinny filter adapter attached to a gas-tight syringe. This procedure produces a clear, colorless liquid phosphorus which is so pure that it remains liquid at room temperature and is solidified with difficulty by repeated tapping on the collection bulb. It has been used, to date, as a starting material for the preparation of phosphorus and polyphosphide films grown by chemical vapor deposition, and by sputtering using the pnictide source disclosed in our above-identified copending United States patent application entitled CONTINUOUS PNICTIDE SOURCE AND DELIVERY SYSTEM FOR FILM DEPOSITION, PARTICULARLY BY CHEMICAL VAPOR DEPOSITION. The material may also be used in such a pnictide source for vacuum evaporation and molecular beam deposition. See the copending application filed herewith entitled HIGH VACUUM DEPOSITION PROCESSES EMPLOYING A CONTINUOUS PNICTIDE DELIVERY SYSTEM.

It will thus be seen that the objects set forth above, among those made apparent from the preceding description, are efficiently obtained and, since certain changes may be made in carrying out the above method without departing from the scope of the invention, it is intended that all matter contained in the above description or shown in the accompanying drawing, shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Particularly, it is to be understood that in the claims ingredients or compounds recited in the singular are intended to include compatible mixtures of such ingredients wherever the sense permits.

Having described our invention what we claim as new and desire to secure by letters patent is:

1. The method of converting high purity red phosphorus to high purity white phosphorus comprising the steps of:
   (A) heating red phosphorus of a purity of at least 99% in vacuo to cause it to vaporize, and
   (B) condensing liquid white phosphorus from the vapor without the aid of a carrier gas in vacuo.
2. The method of claim 1 wherein said heating step is carried out at a temperature within the range of 480° to 490° C.
3. The method of claim 1 or 2 wherein said condensing step is carried out at room temperature.
4. The method of claim 3 and the additional step of filtering the liquid white phosphorus product of said condensing step.
5. The method of claim 1 wherein said heating step is carried out at a temperature within the range of 450° to 550° C.
6. The method of claim 1, 2, or 5 wherein said condensing step is carried out below 100° C.
7. The method of claim 6 and the additional step of filtering the liquid white phosphorus product of said condensing step.
8. The method of claim 1, 2, or 5 and the additional step of filtering the liquid white phosphorus product of said condensing step.
9. The method of claim 1, 2, or 5 wherein said heating step is carried out at a pressure substantially below $10^{-3}$ Torr.
10. The method of claim 9 wherein said heating step is carried out at a pressure substantially below $10^{-3}$ Torr.
11. The method of claim 1, 2, or 5 and the additional step of:
    (C) maintaining the vapor at a temperature within the range of 100° to 400° C.
12. The method of claim 11 wherein said vapor is maintained at about 250° C.

* * * * *